Oct. 11, 1927.  
A. K. HARFORD  
1,645,049  
ARC WELDING SYSTEM  
Filed June 3, 1926  
2 Sheets-Sheet 1

INVENTOR  
Albert K. Harford  
BY White & Prost  
his ATTORNEYS

Oct. 11, 1927.
A. K. HARFORD
1,645,049
ARC WELDING SYSTEM
Filed June 3, 1926
2 Sheets-Sheet 2
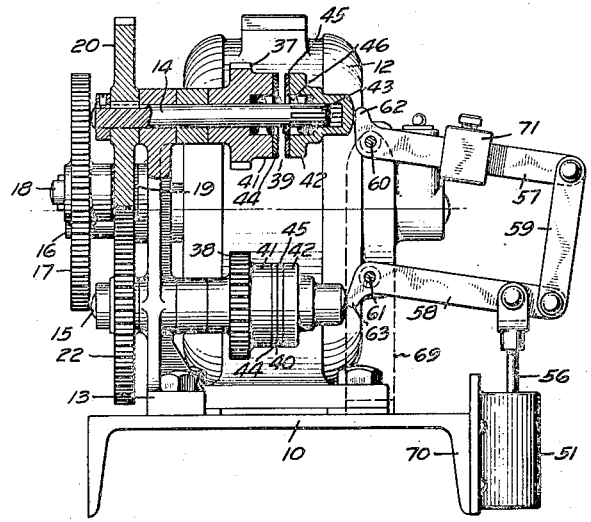
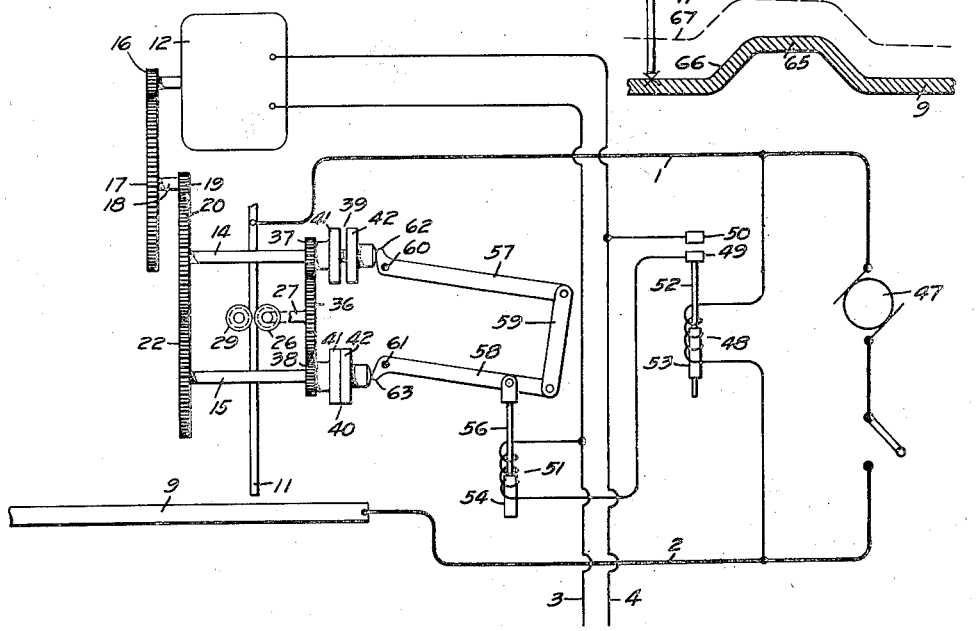
INVENTOR
Albert K. Harford
BY White Prost
his ATTORNEYS Patented Oct. 11, 1927.

1,645,049

UNITED STATES PATENT OFFICE.

ALBERT K. HARFORD, OF OAKLAND, CALIFORNIA, ASSIGNOR TO NEW METAL PRODUCTS COMPANY, OF EMERYVILLE, CALIFORNIA, A CORPORATION OF CALIFORNIA.

ARC-WELDING SYSTEM.

Application filed June 3, 1926. Serial No. 113,404.

This invention relates generally to arc welding systems in which a metallic electrode is employed for establishing an arc directly upon the work to be welded.

One type of welding system in common use employs a metallic electrode in the form of a rod or wire which is moved across the work to be welded. Generally in welding machines for welding long joints, either the electrode support or the work is moved along a straight line and the electrode is fed forward at a rate substantially equal to the rate of consumption. In order to automatically control the rate of feed and thus maintain a stable arc, it has been previously proposed to employ a variable speed feed motor and to control the speed of the same in accordance with the condition of the arc. This arrangement works well as long as the surface of the work is plain, but is not satisfactory when the surface is very irregular as a condition may then occur in which the electrode must be withdrawn in order to prevent short circuiting of the arc.

It is an object of this invention to devise an automatic feed mechanism for an arc electrode which may be driven by a constant speed motor.

It is a further object of this invention to devise an automatic feed mechanism for a welding electrode which will operate to maintain a stable arc while passing over large surface irregularities.

It is a further object of this invention to devise a welding apparatus in which the electrode will not only be fed forward toward the work but will also be automatically withdrawn to pass large irregularities on the work surface.

Further objects of this invention will appear from the following description in which I have set forth the preferred embodiment of my invention. It is to be understood that the scope of the invention is to be determined by reference to the appended claims and the state of the prior art.

Referring to the drawings:

Fig. 3 is a cross sectional view taken along line 3—3 of Fig. 1.

Fig. 4 is a circuit diagram showing the operation of the mechanism.

Fig. 5 is a view showing diagrammatically the manner in which the device of this invention will control movement of the electrodes so that it will pass over large irregularities on the work surface.

Figure 1:
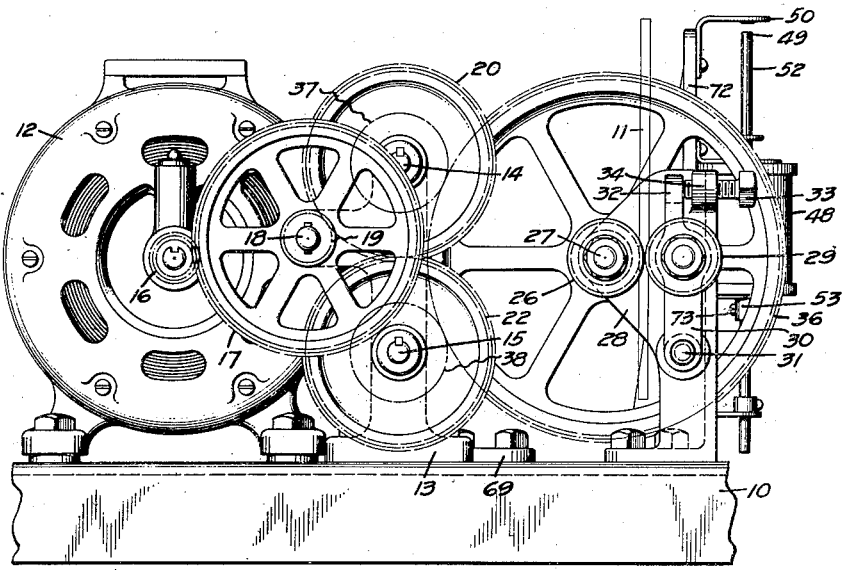
Figure 1 is a side elevational view showing a device incorporating the principles of this invention.
Figure 2:
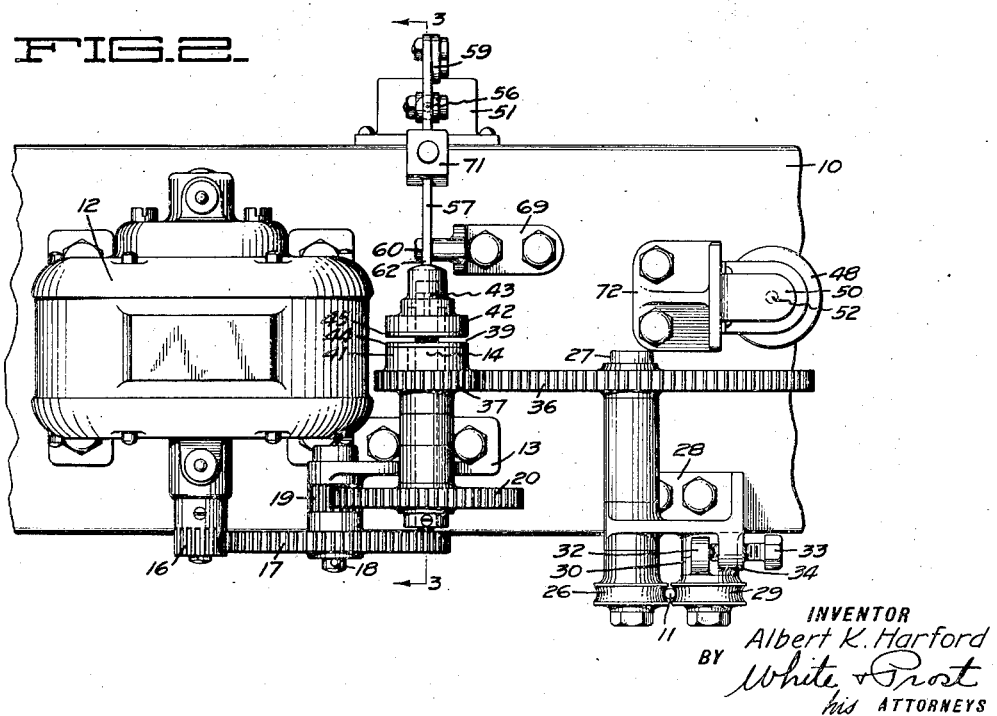
Fig. 2 is a plan view of the device as shown in Fig. 1.

The device comprises generally a constant feed motor which is operatively connected to the electrode by means of an automatically controlled driving mechanism. The drive from the motor is applied to the electrode through a pair of clutches so that upon engagement of one clutch the electrode is fed in one direction and upon engagement of the other clutch the electrode is moved in the opposite direction. Controlling means is provided for actuating these clutches alternately, the controlling means being responsive to the potential variations across the arc.

Referring to the drawings, the mechanism has been shown as mounted upon a base member 10 so that it may be conveniently incorporated in any suitable welding machine. The driving mechanism for the metallic electrode 11 comprises a small motor 12 which is preferably of the constant speed type driven from a suitable source of current such as the A. C. lines 3 and 4. Mounted upon the base by suitable means such as a bracket 13 are the two driven shafts 14 and 15 which are adapted to be rotated in opposite directions by means of the motor 12. Thus for example, the motor may be provided with a pinion 16 meshing with a gear 17 provided upon the counter shaft 18. Rotatable together with the gear 17 is a pinion 19 which meshes with a gear 20 secured to the shaft 14. Meshing with gear 20 there is also a gear 22 secured to the shaft 15 whereby upon operation of the motor 12 the shafts 14 and 15 are driven in opposite directions.

The rod or wire electrode 11 is adapted to be advanced or withdrawn from the work by means of a grooved feed roller 26 which is fixed to a rotatable shaft 27, the shaft 27 being journaled in a bracket 28 mounted upon the base 10. For retaining the electrode 11 against the feed roller 26, an opposed grooved pressure roller 29 may be provided whereby the electrode may be frictionally retained between the respective peripheries of the rollers 26 and 29. In order to vary the pressure between these rollers, the roller 29 may be mounted upon a suitable adjustable support 30. Thus for example, the support 30 has been shown as pivotally mounted as at 31 to the bracket 28. The upper end 32 of the support 30 has been extended to engage an adjustable screw 33 threaded in the lug 34 provided on the bracket 28. By adjustment of the screw 33 it is obvious that the desired pressure may be maintained upon the electrode 11 and if desired the electrode may be readily disengaged from the rollers.

In order to rotate the shaft 27 and thereby feed the electrode with respect to the work upon which a weld is being made, mechanism is provided whereby the shaft 27 may be alternately driven either through the shaft 14 or the shaft 15. Thus mounted upon the shaft 27 there has been provided a gear 36 meshing with the two pinions 37 and 38 which are rotatably mounted upon the shafts 14 and 15 respectively. Suitable clutch devices 39 and 40 have been provided for causing the pinions 37 and 38 to be rotated by their respective shafts 14 and 15. Each of the clutch devices 39 and 40 may comprise for example complementary clutch members 41 and 42, the clutch member 41 being fixed with respect to the pinion 37. Clutch member 42 has been shown as provided with a suitable line connection 43 with the shaft 14 whereby upon its being shifted longitudinally with respect to the shaft into engagement with the clutch member 41 the pinion 37 may be caused to rotate together with the shaft. The engaging portions of the clutch members 41 and 42 may comprise opposed frictional surfaces 44 and 45. Resilient means have also been shown for retaining the clutch members normally out of engagement. For example, a compression spring 46 has been shown as normally pressing the two clutch members apart.

With the mechanism as described above it is apparent that upon engagement of one of the clutch devices the electrode 11 will be advanced toward the work while upon engagement of the other clutch device the electrode will be withdrawn. To control operation of the clutch devices automatic means has been provided responsive to the condition of the arc between the electrode 11 and the work. This automatic control can be best explained by reference to Fig. 4, in which the electrode 11 has been shown in operative relationship to the work 9. Current is supplied to the electrode and work from a suitable source such as a generator 47 connected to the electrode and work by means of conductors 1 and 2. After striking an arc between the electrode 11 and the work 9 it is obvious that the potential difference across the arc will decrease as the electrode is moved closer to the work and will increase as the electrode is moved away from the work or is consumed. I have employed this variation in the potential across the arc for automatically controlling the rate of feed of the electrode 11 so that the arc may be maintained in stable condition. In other words, the potential variations across the arc is maintained between certain practical minimum and maximum limits by automatically controlling the feed of the electrode 11 in response to this potential drop.

To accomplish the above results I have employed a solenoid coil 48 which is preferably shunted directly across the electrode 11 and work 9. This solenoid coil 48 is adapted to actuate a pair of contacts 49 and 50 which are connected in series with a second solenoid coil 51, coil 51 being preferably energized from an independent source of current such as the lines 3 and 4 which supply the motor 12. Contact 49 may be carried for example by a rod 52 having mounted thereon the solenoid core 53. The contact 49 is normally biased to open position as by utilizing the weight of the core 53 and rod 52. Solenoid 51 is provided with a core 54 which is connected by means of the rod 56, to the two clutch actuating levers 57 and 58. The actuating levers 57 and 58 are shown as connected together by means of the link 59, and are pivotally mounted to a suitable stationary support as at 60 and 61 respectively. These levers are also provided with suitable fingers 62 and 63 which are adapted to engage the shiftable clutch members 42 of the two clutch devices 39 and 40 whereby upon movement of the levers in one direction one of the clutch devices will be engaged and upon movement in the other direction the other clutch device will be engaged while the first will be disengaged.

In practice the shaft 14 is driven in such a direction that when the clutch 39 is engaged the electrode will be set forward, while upon engagement of the clutch 40 the shaft 15 will rotate in a direction to withdraw the electrode away from the work. Before an arc is struck and while the electrode 11 is separated from the work 9, if the generator current of say 60 volts is connected to the device then a full 60 volt potential difference will exist across the solenoid coil 48 with the result that the current going through this coil will close contacts 49 and 50 and thus close the circuit through the solenoid coil 51. Levers 57 and 58 will then be actuated to engage the clutch 39 and disengage clutch 40, with the result that the electrode 11 will be advanced towards the work. The arc will be struck when the electrode contacts with the work at which time the potential across the arc will drop to a low value as a result of which insufficient current will pass through the coil 48 to maintain the contacts 49 and 50 in closed position so that the circuit through solenoid 51 will be opened. Levers 57 and 58 will then move to a position to disengage clutch 39 and engage clutch 40 whereby the motor drive will withdraw the electrode from the work. As the electrode is withdrawn it is obvious that the potential across the arc will increase, there being a certain maximum value after which the arc will not be stable in operation. However, before the electrode is withdrawn to the point that the arc becomes unstable, the contacts 49 and 50 will again be closed by the solenoid coil 48 to actuate levers 57 and 58 in order to again advance the electrode. In normal operation after the arc has been struck and when the electrode is being moved across the work which is being welded, such as a seam between two pieces of sheet metal, the electrode is continuously fed forward and backward so that the average rate of advancement is substantially equal to the rate of consumption of the electrode. It is preferable in accomplishing this result to design the motor drive so that it will advance the electrode at a rate greater than the rate of consumption so that the advancement must be interrupted at frequent intervals in order to maintain the correct average rate of advancement.

When the device is incorporated in a welding machine it is to be understood that the feed roller 26 moves in substantially a straight line with respect to the work 9. Referring to Fig. 5, if the surface of the work is of such a character that a pronounced projection 65 must be traversed by the weld, it is obvious that the ordinary type of automatic electrode control which merely varies the speed of advancement, would permit shorting of the electrode against the work since the rate of consumption would not be sufficient to keep the end of the electrode out of contact with the work as the arc attempts to travel up the slope 66 of the projection. With the device of this invention however, the electrode will be actually withdrawn as it progresses up the slope 66 with the result that the arc is maintained in stable condition and a uniform weld may be made over the entire surface of the projection. In other words, considering the dotted line 67 as the effective locus of a point fixed upon the electrode 11 and ignoring the intermittent movements, this locus will gradually approach the surface of the work 9 but will actually rise to clear the projection 65.

For convenience the actuating levers 57 and 58 are pivotally mounted to a suitable bracket 69 mounted upon the base 10 while the solenoid 51 may likewise be mounted upon the flange 70 of the base. For biasing the levers in a direction to normally engage the clutch 40 there is provided a weight 71 which may be fixed at varying distances from the pivotal connection 60. The solenoid coil 48 and contacts 49 and 50 may be mounted upon a suitable support 72 secured to the base 10. For effecting adjustment of the contacts the core 53 may be adjustably secured to the rod 52, adjustment being effected by the set screw 73.

I claim:

1. In an arc welding system, a welding electrode, a source of welding current, means for feeding said electrode with respect to the work upon which a weld is to be made, and means responsive to variations in potential across the arc for maintaining a given average potential across the electrode and work, and adjustable means for changing the value of said average potential.

2. In an arc welding system, a constant speed electric motor, speed reduction transmission elements connected therewith including a pair of reverse clutches, means for feeding a welding electrode to and from the work operated in opposite directions respectively by said clutches, a pivoted lever arranged to operate the clutches respectively upon opposite way movement, welding arc potential controlled means for moving said lever, and adjustable means for biasing said lever in one direction.

3. In an arc welding system, a constant speed electric motor, speed reduction transmission elements connected therewith including a pair of reverse clutches, means for feeding a welding electrode to and from the work operated in opposite directions respectively by said clutches, a pair of pivoted levers arranged respectively to operate said clutches, a link pivotally connecting said levers, a weight adjustable to move said levers in one direction, and electro-magnetic means controlled by the welding arc potential arranged to move said levers in opposition to said weight for alternately throwing said clutches into engagement upon variation of potential.

4. In an arc welding system, a constant speed electric motor, speed reduction transmission elements connected therewith including a pair of reverse clutches, means for feeding a welding electrode to and from the work operated in opposite directions respectively by said clutches, electro-magnetic means controlled by the potential across the welding arc arranged for alternately engaging said clutches upon variation in potential, whereby either one of said clutches is at all times engaged to feed said electrode.

In testimony whereof, I have hereunto set my hand.

ALBERT K. HARFORD.